United States Patent [19]

Chen

[11] Patent Number: 5,605,054
[45] Date of Patent: Feb. 25, 1997

[54] APPARATUS FOR RECLAIMING REFRIGERANT

[75] Inventor: Kuo-Fu Chen, Ping-Tung Hsien, Taiwan

[73] Assignee: Chief Havc Engineering Co., Ltd., Kaohsiung, Taiwan

[21] Appl. No.: 629,875

[22] Filed: Apr. 10, 1996

[51] Int. Cl.⁶ .................................................. F25B 43/04
[52] U.S. Cl. ................................ 62/195; 62/475; 62/470
[58] Field of Search .................................. 62/84, 85, 149, 62/195, 475, 470, 468, 474, 473

[56] References Cited

U.S. PATENT DOCUMENTS 5,101,641  4/1992  Van Steenburgh, Jr. .................. 62/473

5,261,249  11/1993  Manz et al. ................................ 62/149

Primary Examiner—John M. Sollecito
Attorney, Agent, or Firm—Alfred Lei

[57] ABSTRACT

An apparatus for reclaiming refrigerant including a distillation tank, an eliminator arranged within an upper portion of said distillation tank, a booster connected to an upper end of the distillation tank for extracting refrigerant vapor from the distillation tank, a heat exchanger connected to the booster, a heat pump for transferring condensing heat from the heat exchanger to the distillation tank, and an air/water/refrigerant separator connected to the heat exchanger, whereby the apparatus can effectively reclaim refrigerant and separate air and water from the refrigerant.

1 Claim, 3 Drawing Sheets

APPARATUS FOR RECLAIMING REFRIGERANT

BACKGROUND OF THE INVENTION

1. Field of the Invention

This invention relates to an improved apparatus for reclaiming refrigerant.

2. Description of the Prior Art

The conventional apparatus for reclaiming refrigerant (see FIG. 1) mainly includes a refrigerant distillation tank 1 and a heat exchanger 2 for condensing refrigerant. An electric heater 11 is generally used for heating the refrigerant-to-be-reclaimed in the distillation tank 1. Then, the refrigerant turns to vapor and flows into the heat exchanger 2 in which the refrigerant is condensed to liquid. Finally, the refrigerant is filtered by a drier 3. Nevertheless, such an apparatus for reclaiming refrigerant has the following drawbacks:

1. As the refrigerant has a high latent heat value, it will be necessary for the electric heater to consume a large amount of energy in distillation.
2. The refrigerant to be reclaimed usually includes refrigerating oil, water, acid and solid impurities wherein the refrigerating oil and refrigerant are soluble in each other. Hence, when the refrigerant to be reclaimed contains too much refrigerating oil, it will be necessary to heat the distillation tank to a higher temperature in order to distill the refrigerant. Meanwhile, the foams of the refrigerant and refrigerating oil produced in heating will make the eliminator mounted at an upper portion of the distillation tank lose its function, thereby causing the impurities to flow out with the refrigerant vapor. Consequently, it will be very difficult to control the output power of the electric heater of the prior art apparatus for reclaiming refrigerant.
3. As the water-cooled heat exchanger must be connected to a cooling water supply, it will be very inconvenient to reclaim the refrigerant from the chiller units. Furthermore, the temperature of the cooling water will directly influence the speed of reclaiming refrigerant. As the temperature of the cooling water is high, the speed of reclaiming refrigerant will become slow. In the meantime, the temperature of the distillation tank will become higher. If the temperature of the electric heater exceeds a certain value, the refrigerant will be dissolved.
4. It is impossible to separate water from the refrigerant in the distillation process. The refrigerant is only filtered by a drier and so it will become useless for the refrigerant containing a large amount of water.

Therefore, it is an object of the present invention to provide an improved apparatus for reclaiming refrigerant which can obviate and mitigate the above-mentioned drawbacks.

SUMMARY OF THE INVENTION

This invention relates to an improved apparatus for reclaiming refrigerant.

It is the primary object of the present invention to provide an apparatus for reclaiming refrigerant which can effectively separate refrigerant from water and air.

It is another object of the present invention to provide an apparatus for reclaiming refrigerant which consumes only one-third of the energy required by the prior art.

It is still another object of the present invention to provide an apparatus for reclaiming refrigerant which can effectively separate the air, oil and water from the refrigerant.

It is still another object of the present invention to provide an apparatus for reclaiming refrigerant which does not need cooling water.

It is a further object of the present invention to provide an apparatus for reclaiming refrigerant which can be used for chiller units vacuuming thereby facilitating the maintenance.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
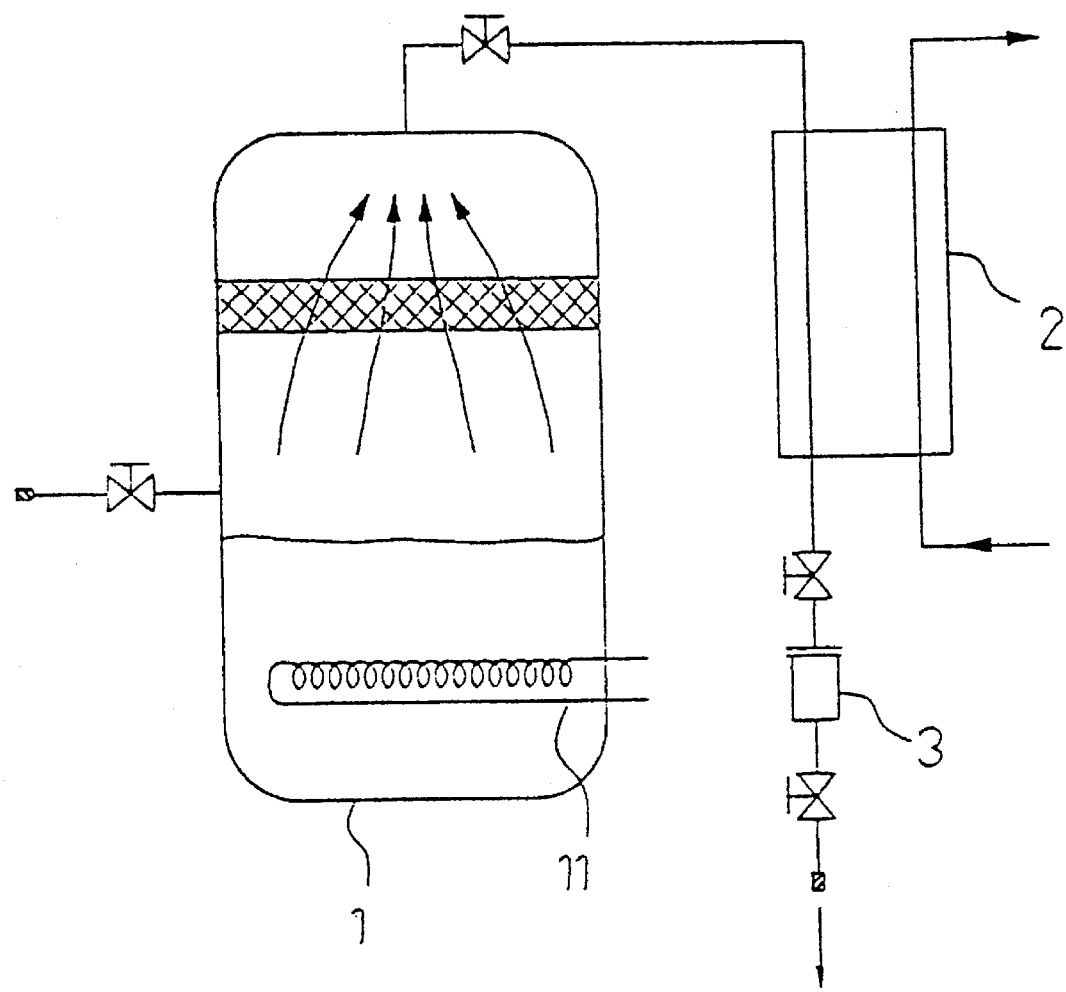
FIG. 1 illustrates a prior art apparatus for reclaiming refrigerant.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
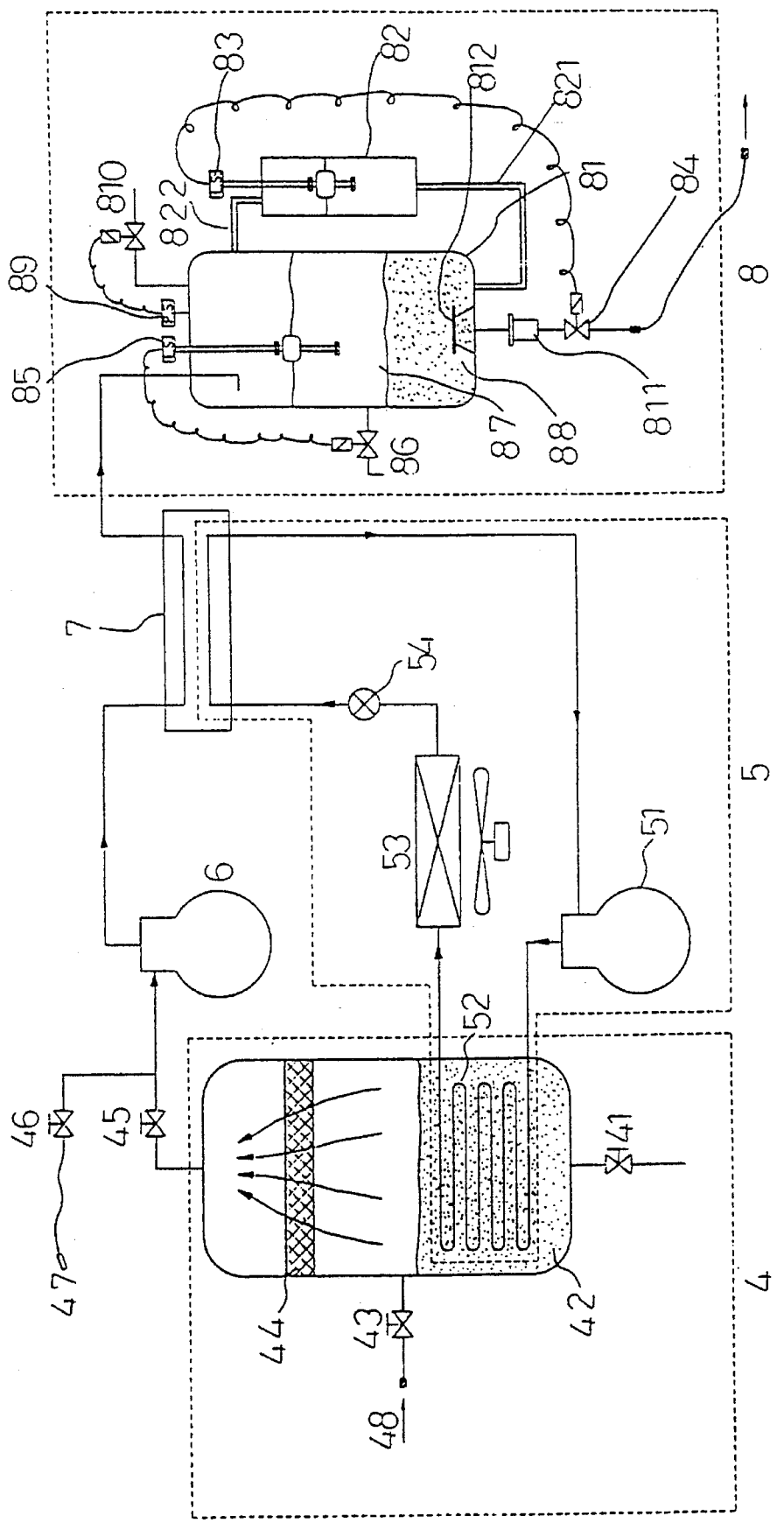
FIG. 2 illustrates an apparatus for reclaiming refrigerant according to the present invention.

With reference to the drawings and in particular to FIG. 2 thereof, the apparatus for reclaiming refrigerant according to the present invention comprises a distillation tank 4, a heat pump 5, a booster 6, a heat exchanger 7 and an air/water/refrigerant separator 8.

In operation, a hand valve 43 is first open to let refrigerant-to-be-reclaimed flowing into the distillation tank 4 through an inlet 8. Then, the distillation tank 4 is heated to boil the refrigerant so as to separate the refrigerant from the refrigerating oil and water. An eliminator 44 is mounted within an upper portion of the distillation tank 4 for preventing the liquid drops of the boiling refrigerant from splashing upward. Thereafter, the remaining refrigerating oil, acid and solid impurities are discharged through an oil drain at the bottom of the distillation tank 4.

The refrigerant evaporated from the distillation tank 4 flows into the booster 6 through a hand valve 45. The booster 6 is a low-pressure compressor and can be used for making vacuum. As the refrigerant is compressed to a state with higher pressure and temperature, the refrigerant flows into the heat exchanger 7 where the refrigerant is condensed to a liquid. The booster 6 has two functions, i.e. the first one is to lower the pressure within the distillation tank 4 so as to make the refrigerant-to-be-reclaimed to boil and evaporate rapidly, the second one is to extract refrigerant vapor from the distillation tank 4 for evaporating the liquid refrigerant in the distillation tank 4 and to use the steady exhaust to control the evaporating rate of the refrigerant thereby ensuring the effective operation of the eliminator 44.

The heat pump 5 is used for transferring the condensing heat of the primary reclaimed refrigerant in the heat exchanger 7 into the distillation tank 4 so as to provide the refrigerant-to-be-reclaimed with evaporation heat. The refrigerant in circuit of the heat pump 5 is an independent closed system. The heat exchanger 7 is an evaporator with respect to the heat pump 5. The refrigerant in low pressure side of the heat pump 5 absorbs heat from the heat exchanger 7 to evaporate and then flow into the compressor 51 in which the refrigerant is compressed to a high temperature and high pressure state. Thereafter, the refrigerant enters into the condenser 52 the piping of which is immersed into the refrigerant-to-be-reclaimed in the distillation tank 4. The high temperature refrigerant in the circuit of the heat pump 5 gradually condenses in the condenser. The heat exhausted from the high pressure side of the heat pump 5 is equal to the sum of the heat absorbed from the low pressure side and the work consumed by the compressor 51.

The high pressure side of the heat pump 5 is provided with an auxiliary condenser 53 for exhausting the heat evolved from the condenser. The refrigerant of the heat pump system first condenses in the auxiliary condenser 53 and then flows back into the heat exchanger 7 via an expansion valve 54 thus forming a heat cycle of the heat pump 5.

The primary reclaimed refrigerant is condensed in the heat exchanger 7 and then flows into the air/water/refrigerant separator 8 which includes an air/water/refrigerant separation chamber 81. As the air, water and refrigerant have different specific weights, the air will be located at the upper portion of the separation chamber 81, the water at the intermediate portion and the refrigerant at the lower portion of the separation chamber 81. The pressure switch 89 is used for setting a certain pressure so that when the air accumulated within the separation chamber 81 exceeds the pressure, the pressure switch 89 will automatically open the air purge valve 810 to discharge air. The water drain 86 is located at one side of the separation chamber 81. The reclaimed refrigerant is discharged through the bottom of the separation chamber 81. The two operations are accomplished by a level switch 85 of the separation chamber 81 and a level switch 83 of the float chamber 82. Finally, the reclaimed refrigerant will flow through a drier 811 for ensuring its dryness. An anti-vortex plate 812 is mounted on the inner bottom of the separation chamber 81 for preventing the refrigerant from whirling out of the separation chamber 81 thereby keeping water from flowing out with the refrigerant.

Figures 3, 4, 5, 6, 7:
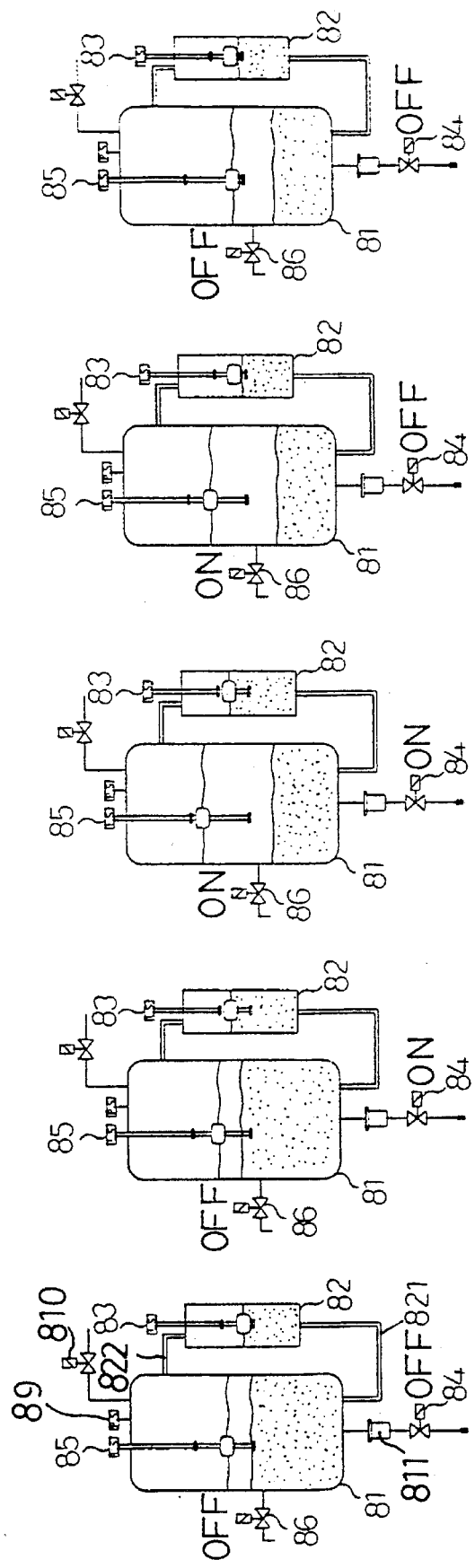
FIGS. 3 through 7 illustrate the working principle of the present invention.

FIGS. 3 through 7 illustrate the working principle of the air/water/refrigerant separator 8. As shown, the separation chamber 81 is provided with a float chamber 82 at one side. The bottom of the float chamber 82 has a connecting pipe 821 which is in communication with the bottom of the separation chamber 81. The upper end of the float chamber 82 is connected to the upper portion of the separation chamber 81 via a pipe 822. The liquid within the float chamber 82 is the reclaimed refrigerant. The upper layer of the liquid within the separation chamber 81 is water, while the lower layer of the liquid is the reclaimed refrigerant. The level switch 83 of the float chamber 82 is used for controlling the operation of the refrigerant drain 84, while the level switch 85 of the separation chamber 81 for controlling the operation of the water drain 86. The level switch 85 is controlled so that when the float reaches the upper limit, the solenoid valve will be turned on until the float drops down to the lower limit. The level switch 85 is larger than the level switch 83 in the liquid level controlling range. As shown in FIG. 3, when the level switches 83 and 85 in the float and separation chambers 82 and 81 do not reach their upper limits, the refrigerant drain 84 and the water drain 86 are closed. As illustrated in FIG. 4, the liquid level in the float chamber 82 reaches the upper limit and the level switch 83 opens the refrigerant drain 84; the liquid level in the separation chamber 81 does not reach its upper limit and this means the water accumulated in the separation chamber does not exceeds a predetermined quantity and the water drain 86 is kept closed. As can be seen in FIG,. 5, the liquid level in the separation chamber 81 reaches an upper limit, the level switch 85 opens the water drain 86 and the level valve 85 is kept open. As shown in FIG. 6, the liquid level in the separation chamber 81 does not drop to the lower limit thus keeping the water drain 86 open, while the liquid level in the float chamber 82 drops down to the lower limit hence closing the refrigerant drain 84. As illustrated in FIG. 7, the liquid levels drop down to the lower limits and so the refrigerant drain 84 and the water drain 86 are all kept closed.

Furthermore, the present invention not only can be used for reclaiming refrigerant, but also is suitable for maintaining the chiller units. After the refrigerant has been reclaimed and the chiller units has been maintained, turn off the hand valve 45, turn on the hand valve 46, connect the flexible pipe 47 to the maintaining hole of the chiller units, turn on the present invention to make the chiller units vacuum, and fill the reclaimed refrigerant back into the chiller units.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An apparatus for reclaiming refrigerant comprising:
   a distillation tank;
   an eliminator arranged within an upper portion of said distillation tank;
   a booster connected to an upper end of said distillation tank for extracting refrigerant vapor from said distillation tank;
   a heat exchanger connected to said booster;
   a heat pump for transferring condensing heat from said heat exchanger to said distillation tank; and
   an air/water/refrigerant separator connected to said heat exchanger, said separator including a separation chamber and a float chamber which are connected in parallel to said separation chamber, said separation chamber being provided with a level switch, a pressure switch and an anti-vortex plate, said float chamber being provided with a level switch.

\* \* \* \* \*